United States Patent
Bradley et al.

(10) Patent No.: US 11,357,264 B2
(45) Date of Patent: Jun. 14, 2022

(54) SYSTEM AND METHOD FOR CHARGING LOW POWER DEVICES USING PHONE CHARGING PORT

(71) Applicant: North Shore Capital LLC, San Mateo, CA (US)

(72) Inventors: Mark A. Bradley, San Mateo, CA (US); Austin D. Bradley, San Mateo, CA (US)

(73) Assignee: North Shore Capital LLC, San Mateo, CA (US)

( * ) Notice: Subject to any disclaimer, the term of this patent is extended or adjusted under 35 U.S.C. 154(b) by 194 days.

(21) Appl. No.: 16/818,746

(22) Filed: Mar. 13, 2020

(65) Prior Publication Data

US 2020/0297034 A1 Sep. 24, 2020

Related U.S. Application Data

(60) Provisional application No. 62/820,258, filed on Mar. 18, 2019.

(51) Int. Cl.
*H02J 7/00* (2006.01)
*A24F 40/90* (2020.01)

(52) U.S. Cl.
CPC ............ *A24F 40/90* (2020.01); *H02J 7/0044* (2013.01); *H02J 7/00047* (2020.01); *H02J 2207/30* (2020.01); *H02J 2310/22* (2020.01)

(58) Field of Classification Search
None
See application file for complete search history.

(56) References Cited

U.S. PATENT DOCUMENTS

| | | | |
|---|---|---|---|
| 9,433,242 B1 | 9/2016 | Buffone | |
| 10,003,372 B2 | 6/2018 | Stanimirovic et al. | |
| 10,051,893 B2 | 8/2018 | Hoffman et al. | |
| 2014/0195826 A1* | 7/2014 | Wojcik | G06F 1/1632 713/300 |
| 2017/0196270 A1 | 7/2017 | Vick et al. | |
| 2018/0302507 A1* | 10/2018 | Johnson | H04M 1/6033 |

OTHER PUBLICATIONS

Daniel Kuntz, "LifeCable, the Any-Device Power Sharing Cable", Indiegogo, viewed online Mar. 9, 2020 at https://www.indiegogo.com/projects/lifecable-the-any-device-power-sharing-cable#/, 1 page.
Jdowns, "Charge Juul with a Smartphone?", YouTube, posted Sep. 6, 2018, viewed online at https://www.youtube.com/watch?v=ufC-0Y2h-_M., 1 page.
Radhika Seth, "Backup Powered iPhone Frame", Yanko Design, Jul. 8, 2013, viewed online at https://www.yankodesign.com/2013/07/08/backup-powered-iphone-frame/, 10 pages.

* cited by examiner

*Primary Examiner* — Arun C Williams
(74) *Attorney, Agent, or Firm* — Daylight Law, P.C.

(57) ABSTRACT

Systems and methods for charging low power devices are disclosed. One disclosed method for charging accessory comprises coupling a port of the accessory to a first connector of a charging device, coupling a port of a phone to a second connector of the charging device, and transferring power from a battery of the phone to a battery of the accessory via the charging device. The port of the phone is a lightning port. The accessory is an electronic cigarette. The first connector is compatible with the accessory.

17 Claims, 4 Drawing Sheets

200

201

211

210

SYSTEM AND METHOD FOR CHARGING LOW POWER DEVICES USING PHONE CHARGING PORT

CROSS REFERENCE TO RELATED APPLICATIONS

This application claims the benefit of U.S. Provisional Patent Application No. 62/820,258, filed Mar. 18, 2019, which is incorporated by reference herein in its entirety for all purposes.

SUMMARY

Systems and methods for charging a device using a phone port are disclosed herein. The charging device can include a first charging connector, a second charging connector, and a wire. A wire, as used herein, refers to a conductive path with relatively low resistance used for channeling charge carriers through a system. The first charging connector can be compatible with and coupled to a port of the device. The second charging connector can be compatible with and coupled to a port of the phone. Subsequently, power can be transferred from a battery of the phone to a battery of the device via the charging device.

The charging device can include further structures which render the device configured to attach to the phone. The further structures can include one or more attachment structures such as a clamp, a magnet, an adhesive, or a sleeve. The further structures can include a holder for the device. The holder can be of any suitable material, such as plastic, rubber, silicone or metal where the entire device can be enclosed in and held to the phone along with the holder. The first charging connector can be located in the holder and be compatible with a port of the device. The holder can be connected to the one or more attachment structures. The holder can also be connected to the second charging connector. The one or more attachment structures can be fixed to the device and/or phone with or without applying tension or pressure. For example, the charging device can be a plastic adapter that can be plugged in to a phone port and held solely by the connective force of the port while the device is held within a holder by an attachment device such as one or more magnets located in the holder.

The charging device can include further structures to control the characteristics of the power transferred from the battery of the phone to a battery of the device. The charging device can include voltage sensing means, current sensing means, and voltage or current regulators to measure the condition of the battery or batteries and to control the current or voltage applied to the device from the phone. The regulators can include linear or switching regulators. The regulators can be connected in series between the first charging connector and the second charging connector or integrated on the first charging connector and/or second charging connector.

In specific embodiments of the invention, the device is an accessory. In specific embodiments of the invention the device is a low power device. In specific embodiments of the invention, the device is an electronic cigarette or hand-held vaporizer. In specific embodiments of the invention, the accessory is a part of the device. In specific embodiments of the invention in which the accessory is an electronic cigarette or hand-held vaporizer, a port used to charge the accessory can be on one of the electronic cigarette, an electronic cigarette pod holder, or an electronic cigarette battery or battery holder. In specific embodiments of the invention, the phone port is a USB-C port, a Micro USB port, or a lightning port. In specific embodiments of the invention, the phone is a smart phone which operates the Apple iOS or the Android OS. In specific embodiments of the invention, the port is driven by the charging device such that the phone enters a communication protocol in which the phone provides a set voltage or set current to the port in accordance with a mode of the communication protocol. Power can then be transferred from the battery of the phone to the battery of the device via the powering of the connection in accordance with the mode of the communication protocol regardless of whether or not the communication protocol was intended to merely power a downstream device for operation rather than for charging, or merely power the connection for purposes of transmitting data.

DETAILED DESCRIPTION

Figure 1:
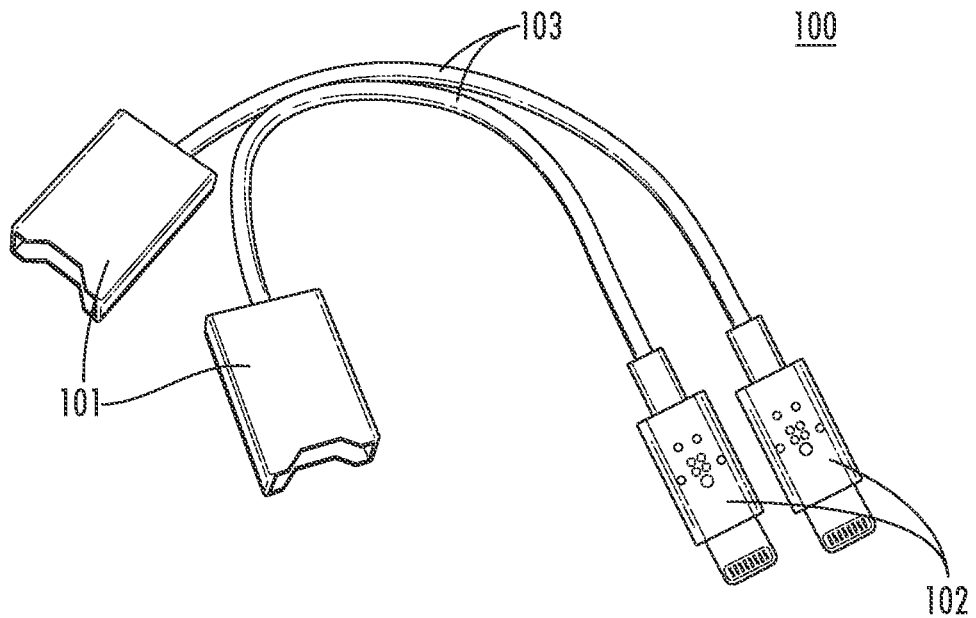
FIG. 1 is an illustration of two sets of charging devices in accordance with specific embodiments of the invention disclosed herein.
Figure 1:
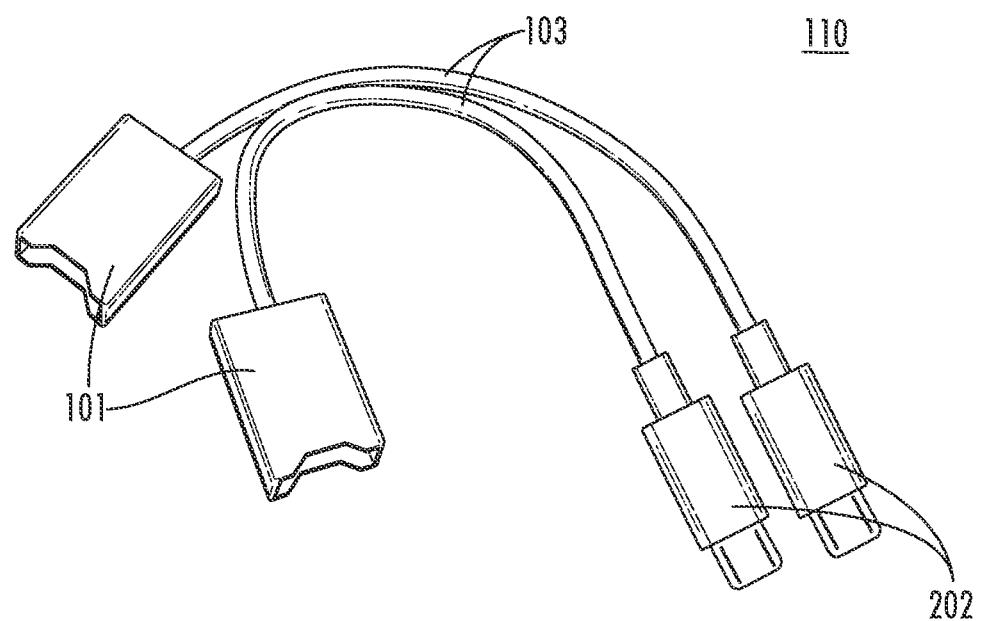

FIG. 1 illustrates two charging devices in a first view 100 and two alternative charging devices in a second view 110. The devices in both views include first charging connectors 101. The first charging connectors 101 in FIG. 1 are compatible with and can be coupled to a port on a Juul electronic cigarette. The devices in first view 100 include second charging connectors 102 that are compatible with and can be coupled to a lightning port on an Apple device such as an Apple iPhone 8 or X model. The devices in second view 110 include second charging connectors 202 that are compatible with and can be coupled to a USB-C port. The USB-C port could be the port on an Android phone. The charging device in both views includes a wire 103 connecting the first and second charging connectors. When the charging connectors are both connected to their respective powers power can flow from the second charging connector to the first charging connector to charge the Juul. Although not illustrated, a power regulator such as a linear or switching voltage regulator could be placed in series with the wire to control the flow of power through the wire. The wire can be a sheathed wire. The wire can also be enclosed in a plastic form factor, a mold, or a holder attached to a phone. The charging device can include any kind of conductive path with relatively low resistance for channeling charge carriers through a system so that it draws power from a first device, such as a cell phone, and uses it to charge a battery. For example, soldering may be provided in order to ensure a power flow. In specific embodiments, the charging device may be an adapter made of any suitable material, such as a plastic adapter, that allows a power flow between to devices.

Figure 2:
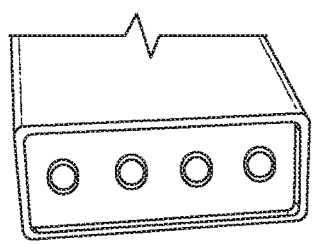
FIG. 2 is an illustration of an example accessory charging port and an example phone port that can be used in accordance with specific embodiments of the invention disclosed herein.
Figure 2:
Figure 2:
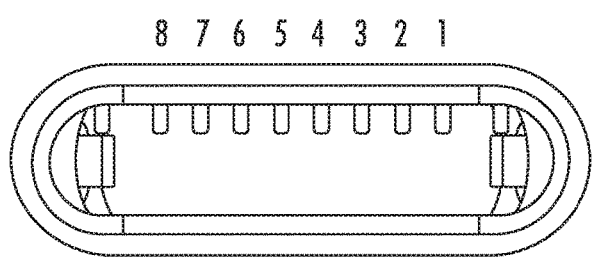
Figure 2:
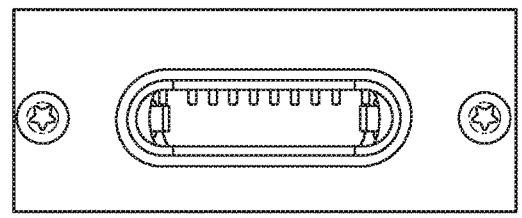

FIG. 2 is an illustration of an example accessory charging port and an example phone port that can be used in accordance with specific embodiments of the invention disclosed herein. FIG. 2 includes an illustration of a first charging port 200 in accordance with this disclosure in the form of a charging port for a Juul electronic cigarette. As shown, in pin diagram 201, the charging port includes two pins for receiving power. Power is delivered in the form of a voltage maintained across the pins while current is delivered to a battery of the Juul. FIG. 2 also includes an illustration of a second charging port 210 in accordance with this disclosure in the form of a lightning port. The port is used for both the transfer of information to and from the device as well as for receiving power to charge the internal battery of the device. However, in accordance with this disclosure, the port can also be used as the source of power for charging an external battery. The pin out diagram 211 shows the pins of the port which are ground (1), lane 0 (2,3), identification 0 (4), power (5), lane 1 (6,7) and identification 1. As described below, the pins of port 210 can be driven by a second charging connector of a charging device in accordance with this disclosure in order to obtain power from pin 5 in order to charge the battery of a device connected for a first charging connector of a charging device in accordance with this disclosure.

Figure 3:
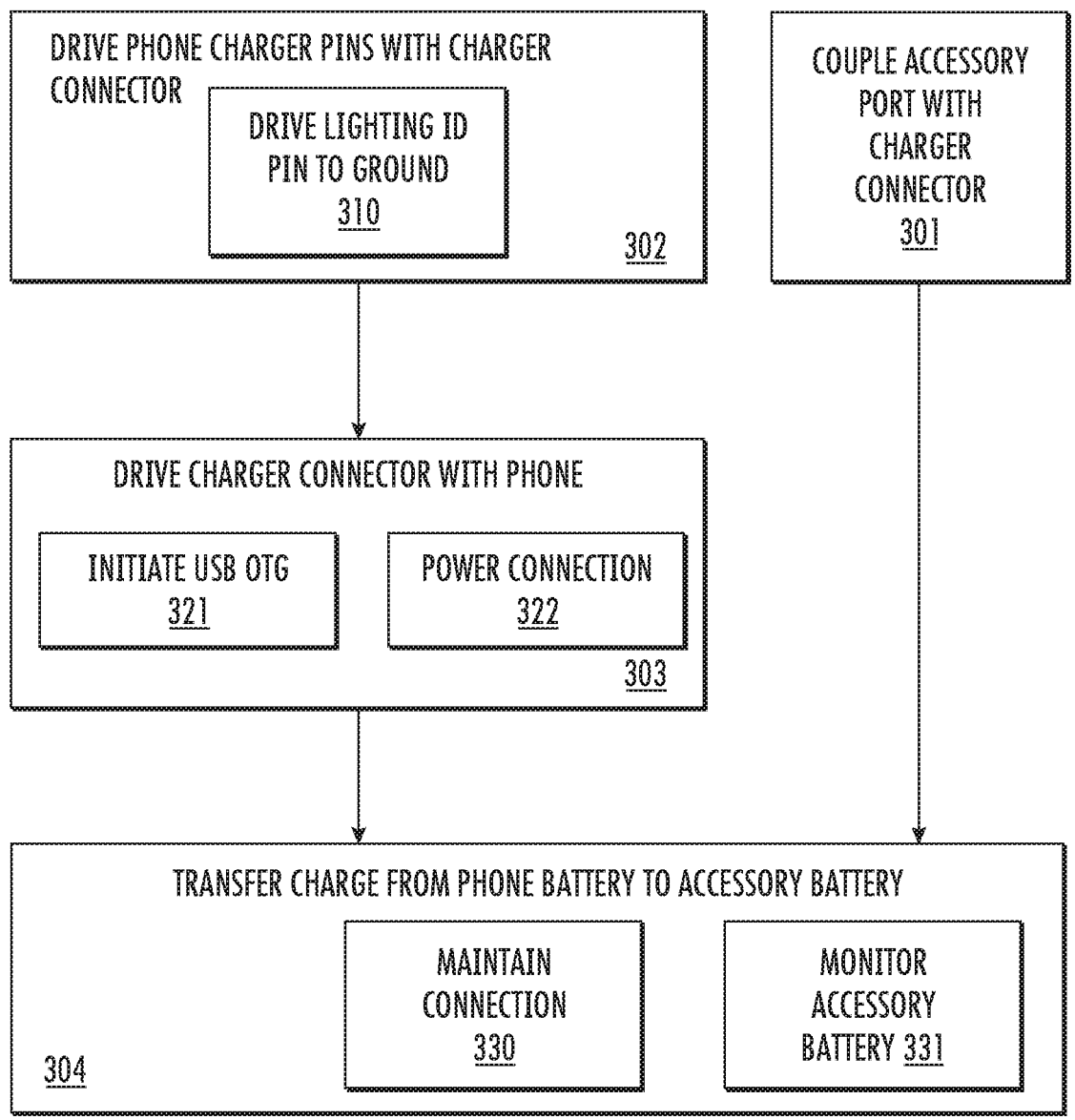
FIG. 3 is a flow chart for a set of methods in accordance with specific embodiments of the invention disclosed herein.

FIG. 3 illustrates a flow chart 300 for a set of methods in accordance with specific embodiments of the invention disclosed herein. Flow chart 300 includes a step 301 of coupling a charging port on an accessory with a first charging connector of a charging device. Flow chart 300 also includes a step 302 of driving a port on a phone with a second charging connector of a charging device. These steps can be conducted in either order as the phone and accessory are connected to the charging device.

In specific embodiments of the invention, the step of driving the port on the phone can involve connecting specific pins to ground or coupling specific pins to the phone's own power pins. This can be done using the second connector of the charging device. The second connector can be configured to provide power to one or more pins from another set of pins, connect one or more pins to ground, and/or send digital signals to one or more pins. Flow chart 300 includes a step 310 conducted in specific embodiments in which the port on the phone is a lightning port and driving the pins involves connecting the ID 0 and/or ID 1 pin to ground. These steps can be conducted in order to trigger a communication protocol at the port of the phone.

Flow chart 300 continues with a step 303 of driving the second charger connector with the phone. This step can involve a step 322 of providing power to a connection in accordance with a communication protocol which was initiated in response to step 302. More specifically, this step can involve a step 321 of initiating a universal serial bus on-the-go protocol, or other USB protocol in which the phone port provides power to the connection. This power can be provided for purposes of facilitating communication through the connection or for powering the operation of a downstream device. Step 322 can involve providing, from the phone port, one of a set voltage or set current to the first connector in accordance with the communication protocol. For example, the step could involve providing a voltage of 5V, 3.3 V, or any standard consumer electronic communication protocol required voltage (e.g., less than 5V). Devices designed to operate with these protocols will be designed to provide a certain level of current or voltage at that set voltage or current. The current of voltage is usually relatively low as it is used to power peripheral devices or just power the connection. For example, the level of current on most standard consumer electronics communication protocols is on the order of 100s of mA, such as less than 200 mA. However, if the first charging connector is connected to a low power device, the amount of current or voltage could be sufficient to charge the battery of the low power device.

Flow chart 300 continues with a step 304 of transferring charge from a phone battery to an accessory battery via the charging device. In embodiments in which power is being drawn from the port of the phone based on placing the phone in a condition to support a specific communication protocol via the port, power can be transferred from the battery of the phone to the battery of the device via the powering of the connection in accordance with the mode of the communication protocol regardless of whether or not the communication protocol was intended to merely power a downstream device for operation rather than for charging, or merely power the connection for purposes of transmitting data.

The speed of power transfer can be determined by the battery of the device being charged and the manner in which power is being drawn from the phone port. For example, if the phone was set to provide power in accordance with a communication protocol, the max rated power draw in accordance with that protocol would form a limit for the speed of charging. The speed of power transfer could also be affected by a regulator on the charging device.

Step 304 could alternatively include a step 330 of maintaining the connection during the power transfer. For example, the step could involve instantiating an application on the phone which maintains compliance with the communication protocol at the first connector.

Step 304 could alternatively include a step 331 of monitoring a battery of the device being charged, in order to indicate when charging was complete, or to stop drawing power from the phone when the device reached a certain charge. Likewise, the step could involve monitoring the battery of the phone in order to stop drawing power if the phone's battery was depleted past a given threshold. In embodiments in which an application is instantiated on the phone, the application could terminate the communication protocol allowing the power to be drawn from the phone port, or otherwise prevent power from being drawn from the phone port in response to the phone's battery descending past that threshold, or upon the accessory battery being charged to a certain charge.

The charging device can include further structures which render the device configured to attach to the phone without the need for loose wires. The further structures can include an attachment structure such as a clamp, an adhesive, or a sleeve. The further structures can include a holder for the device. The first charging connector can be located in the holder and be compatible with a port of the device. The holder can be connected to the attachment structure. The holder can also be connected to the second charging connector.

Figure 4:
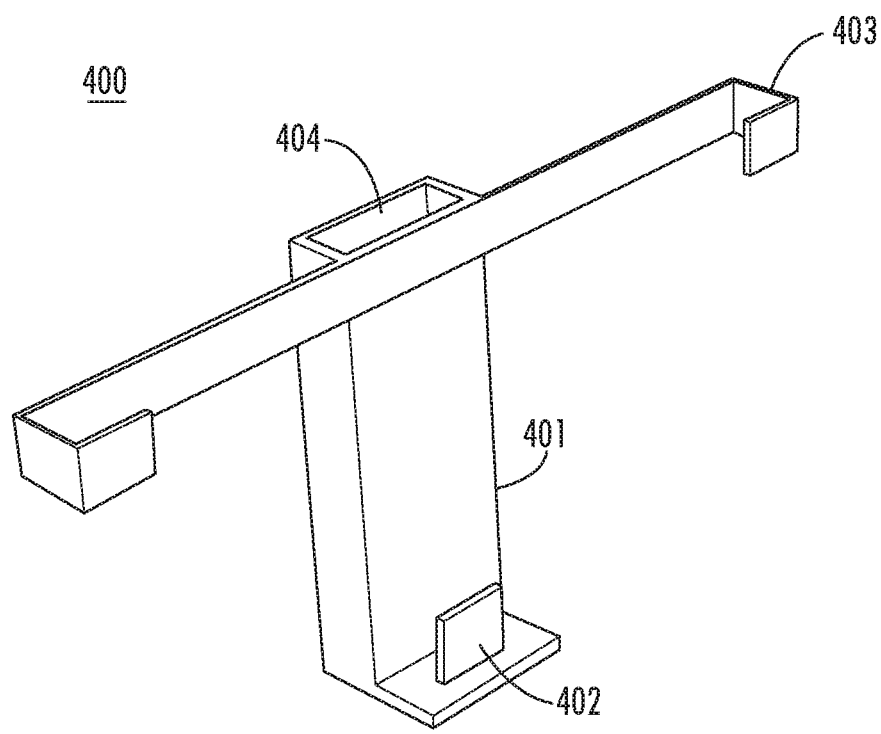
FIG. 4 provides an illustration of a charging device in accordance with specific embodiments of the invention disclosed herein.
Figure 4:
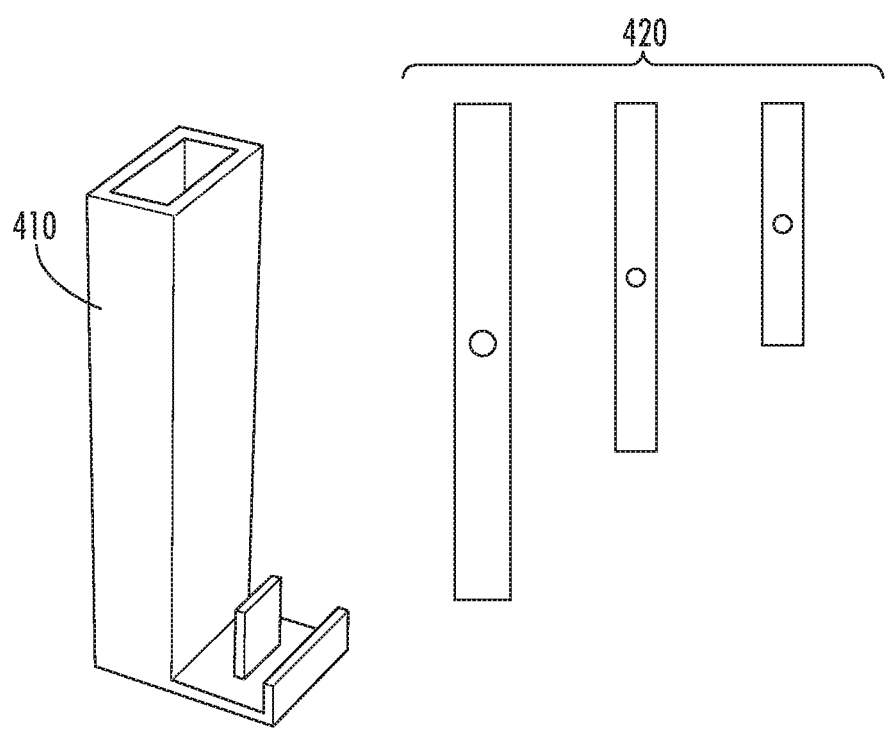

FIG. 4 provides an illustration of a charging device 400 in accordance with specific embodiments of the invention disclosed herein. Charging device 400 includes a holder 401 for an accessory, a clamp 403, a first charging connector located at the bottom of sleeve 404, and a second charging connector 402. A wire, and possibly a power regulator internal to holder 401 could connect second charging connector 402 with the first charging connector. First charging connector could be compatible with a charging port of the accessory. Sleeve 404 could be configured to house the accessory. Clamp 403 is connected to holder 401 and is configured to connect to at least two sides of a phone. The clamp could include rubber grips to attach to the phone. In specific embodiments of the invention, the holder could be connected to the phone via an alternative attachment means including any system that applied pressure or tension to one, two, or more sides of the phone. The attachment means could also include any system which applied pressure or tension to the connection of the second charging connector and the phone port. In specific embodiments of the invention, pressure or tension is not necessary. For example, terminal ends can be directly connected and magnets in the sleeve could hold the device in the desired place. FIG. 4 also illustrates how a single model for the holder and connectors 410 could be paired with a set 420 of clamps of difference sizes to allow an end user to adapt the charging device to the particular footprint of their phone. The user could select one clamp from the set 420 and connect it to the holder to provide this customization by hand.

The charging device could include an authorization chip used to authorize the device for interaction with the phone port. The authorization chip could be internal to the second charging connector.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure where generally directed to chargers for electronic cigarettes, the same approaches could be utilized to charge any accessory or device. These and other modifications and variations to the present invention may be practiced by those skilled in the art, without departing from the scope of the present invention, which is more particularly set forth in the appended claims.

What is claimed is:

1. A method for charging an accessory comprising:
coupling a port of the accessory to a first connector of a charging device;
coupling a port of a phone to a second connector of the charging device;
driving pins of the port of the phone, using the second connector of the charging device, to trigger a communication protocol at the port of the phone;
providing, from the phone, one of a set voltage and a set current to the first connector in accordance with the communication protocol; and
transferring power from a battery of the phone to a battery of the accessory via the charging device;
wherein the port of the phone is a lightning port;
wherein the accessory is an electronic cigarette;
wherein the first connector is compatible with the accessory; and
wherein power is transferred from the battery of the phone to the battery of the accessory via the providing of the set voltage or set current.

2. The method of claim 1, wherein the port of the accessory is on one of:
the electronic cigarette; an electronic cigarette pod holder for the electronic cigarette; and an electronic cigarette battery of the electronic cigarette.

3. The method of claim 1, wherein:
the communication protocol is a universal serial bus on the go protocol.

4. The method of claim 1, further comprising:
instantiating an application on the phone which maintains compliance with the communication protocol at the first connector.

5. The method of claim 1, wherein:
the charging device consists essentially of the first connector, the second connector, and a sheathed wire.

6. The method of claim 1, wherein:
the charging device comprises a holder for the accessory, a clamp, the first connector, the second connector, and a wire.

7. The method of claim 1, wherein:
the communication protocol requires a set voltage of less than five volts and an accompanying maximum current of less than 200 mA.

8. A device for charging an accessory comprising:
a holder for the accessory;
a first charging connector located in the holder and compatible with a port of the accessory;
a clamp connected to the holder and configured to connect to at least two sides of a phone;
a second charging connector compatible with a port of the phone and configured to drive pins of the port of the phone to trigger a communication protocol;
a wire coupling the first charging connector to the second charging connector; and
wherein power is transferred from a battery of the phone to a battery of the accessory by providing one of a set voltage or a set current to the first charging connector in accordance with the communication protocol.

9. The device of claim 8, wherein:
the accessory is an electronic cigarette; and
the port of the accessory is on one of: the electronic cigarette; an electronic cigarette pod holder for the electronic cigarette; and an electronic cigarette battery of the electronic cigarette.

10. The device of claim 8, wherein:
the port of the phone is one of a lightning port, a USB-C port, and a Micro USB port; and
the port of the phone is used for one or more of: transferring information; receiving power to charge an internal battery and charging an external battery.

11. The device of claim 8, wherein the device includes an authorization chip to authorize interaction with the port of the phone.

12. The device of claim 8, wherein:
the first charging connector is connected to the port of the accessory;
the second charging connector is connected to the port of the phone;
wherein connection of the first charging connector and the second charging connector allows a power flow from the second charging connector to the first charging connector; and
wherein a power regulator is used to control the power flow between the first charging connector and the second charging connector.

13. A device for charging an electronic cigarette comprising:
a first connector compatible with a port of the electronic cigarette;
a second connector compatible with a lightning port of a phone and configured to drive pins of the port of the phone to trigger a communication protocol at the port of the phone; and
a wire coupling the first connector to the second connector and configured to draw power from a battery of the phone to a battery of the electronic cigarette by providing, from the phone, one of a set voltage or set current to the first connector in accordance with the communication protocol.

14. The device of claim 13, wherein the port of the electronic cigarette is on one of: the electronic cigarette; an electronic cigarette pod holder for the electronic cigarette; and an electronic cigarette battery.

15. The device of claim 13, wherein the device includes an authorization chip to authorize interaction with the lightning port of the phone.

16. The device of claim 13, wherein:
- the first connector is connected to the port of the electronic cigarette;
- the second connector is connected to the lightning port of the phone;
- wherein connection of the first connector and the second connector allows a power flow from the second connector to the first connector; and
- wherein a power regulator is used to control the power flow between the first connector and the second connector.

17. The device of claim 13, wherein the lightning port is used for one or more of: transferring information; receiving power to charge an internal battery and charging an external battery.

* * * * *